United States Patent [19]

Sanai

[11] Patent Number: 4,882,635
[45] Date of Patent: Nov. 21, 1989

[54] ROTATING DRUM DEVICE FOR A VCR IN WHICH THE POSITION OF THE MAGNETIC HEAD IS CONTROLLED BY A MAGNETIC POSITIONING DEVICE

[75] Inventor: Yukiharu Sanai, Nagaokakyo, Japan

[73] Assignee: Mitsubishi Denki Kabushiki Kaisha, Tokyo, Japan

[21] Appl. No.: 73,163

[22] Filed: Jul. 14, 1987

[30] Foreign Application Priority Data

Jul. 16, 1986 [JP] Japan .................................. 61-168732
Jan. 10, 1987 [JP] Japan ..................................... 62-3713

[51] Int. Cl.$^4$ .......................... G11B 5/53; G11B 5/588
[52] U.S. Cl. .................................. 360/10.2; 360/10.3; 360/77.16; 360/109
[58] Field of Search ................... 360/75, 77, 107, 109, 360/84, 85, 10.2, 10.1, 10.3, 70, 77.12, 77.13, 77.16, 77.14, 77.15

[56] References Cited

U.S. PATENT DOCUMENTS

| | | | |
|---|---|---|---|
| 4,314,284 | 2/1982 | Sato et al. ............................ | 360/10.2 |
| 4,337,492 | 6/1982 | Brookhart et al. ................... | 360/109 |
| 4,363,046 | 12/1982 | Saito ..................................... | 360/106 |
| 4,365,279 | 12/1982 | Kinjo ..................................... | 360/109 |
| 4,426,665 | 1/1984 | Bradford et al. ..................... | 360/10.2 |
| 4,446,497 | 5/1984 | Hirayama ............................. | 360/109 |
| 4,564,876 | 1/1986 | Takahashi et al. ................... | 360/107 |
| 4,642,707 | 2/1987 | Geiger et al. ......................... | 360/77 |
| 4,695,907 | 9/1987 | Inaji et al. ............................. | 360/107 |
| 4,710,828 | 12/1987 | Sulzer .................................... | 360/75 |

FOREIGN PATENT DOCUMENTS

| | | |
|---|---|---|
| 0037715 | 10/1981 | European Pat. Off. . |
| 0145331 | 6/1985 | European Pat. Off. . |
| 0168269 | 1/1986 | European Pat. Off. . |
| 1933736 | 1/1970 | Fed. Rep. of Germany . |
| 3120462 | 4/1982 | Fed. Rep. of Germany . |
| 1579854 | 11/1980 | United Kingdom . |
| 2060974 | 5/1981 | United Kingdom . |
| 2076578 | 12/1981 | United Kingdom . |
| 2113450 | 8/1983 | United Kingdom . |
| 2137400 | 10/1984 | United Kingdom . |

OTHER PUBLICATIONS

National Technical Report, vol. 28, No. 3, Jun. 1982, "Noiseless Trick-Play Techniques Using Piezoelectric Ceramic Actuator for VTRs".

Primary Examiner—Alan Faber
Assistant Examiner—Steven R. Garland
Attorney, Agent, or Firm—Olbon, Spivak, McClelland, Maier & Neustadt

[57] ABSTRACT

A rotating drum device, of a tape that a magnetic head scans recording tracks which are formed obliquely with respect to a travelling direction of a magnetic tape at any speed of the magnetic tape, comprises a driving part attached to a rotating drum, a supporting member supporting a magnetic head, a coil mounted on the supporting member and a magnetic unit. A control electric current is supplied to the coil depending on the travelling speed of the magnetic tape to produce a magnetic force, whereby the magnetic head is vertically moved along the axis of rotation of the rotating drum.

30 Claims, 7 Drawing Sheets

ROTATING DRUM DEVICE FOR A VCR IN WHICH THE POSITION OF THE MAGNETIC HEAD IS CONTROLLED BY A MAGNETIC POSITIONING DEVICE

FIELD OF THE INVENTION

The present invention relates to a rotating drum device capable of tracing exactly tracks of magnetically recorded data by moving vertically a magnetic head mounted on a rotating drum along the axis of rotation of the drum to thereby improve the quality of images reproduced from a video tape recorder (VTR).

BACKGROUND OF THE INVENTION

FIG. 1 is a cross-sectional view of a conventional rotating drum device. In FIG. 1, a reference numeral 1 designates a rotary shaft, a numeral 2 designates a fixed lower drum, a numeral 3 designates a rotating upper drum, a numeral 4 designates a head table detachably connected to the upper drum 3 by means of screws, a numeral 5 designates a magnetic head firmly connected to an end of the head table 4, a numeral 6 designates bearings placed between the rotary shaft 1 and the lower drum 2 to allow relative rotation of the lower drum 2 with respect to the rotary shaft 1, a numeral 7 designates an upper transmitter capable of rotating along with the upper drum 3, a numeral 9 designates a base block firmly attached to the rotary shaft 1 to support the upper drum 3, and a numeral 13 designates a magnetic tape.

The magnetic head 5 is placed at a fixed position with reference to the upper drum 3 and has its end slightly projecting from the outer periphery of the upper drum 3 which is rotated at a constant high speed. The magnetic tape 13 is obliquely wrapped around the outer circumferential surfaces of the upper and lower drums 3, 2 so as to travel on the surfaces at a predetermined speed, whereby the magnetic head 5 records or reproduces electromagnetically signals of images or sounds by the contact to the magnetic tape 13.

The upper transmitter 7 is attached to the base block 9 and rotates along with the base block 9. The magnetic head 5 is electrically connected to the upper transmitter 7 via a first connecting part 10, a wiring plate 11, and a second connecting part 12. A lower transmitter 8 faces the upper transmitter 7 with a minute space. The upper and lower transmitters 7, 8 are magnetically coupled for mutual transmission of signals. The lower transmitter 8 is connected to a signal processing unit (not shown) as an exterior device.

When the magnetic tape 13 travels on the outer circumferential surfaces of the upper and lower drums 3, 2 while the magnetic head 5 is rotated, the magnetic head 5 obliquely traverses on the magnetic tape 13. Lines which obliquely traverse the magnetic tape 13 are parallel with each other. FIG. 2 is a diagram showing a relation of the tracks of the magnetic head 5 to the magnetic tape 13. In FIG. 2, a reference numeral 13a designates a track of the magnetic tape 13, a symbol $V_1$ represents a normal feeding speed of the magnetic tape 13, a numeral 5a is a track of the magnetic head 5, and a symbol $V_0$ represents a speed of rotation of the magnetic head 5. As is apparent from FIG. 2, the track 13a and the track 5a are crossed, whereby the track (the traversing line) which is drawn on the magnetic tape 13 by the magnetic head 5 assumes as indicated by a character A as shown in FIG. 2a.

When the speed of the magnetic tape 13 is increased from a feeding speed $V_1$ to a speed $V_2$ (for instance, when high speed searching is to be conducted), a relative track of the magnetic head 5 to the magnetic tape 13 is shown by a character B as shown in FIG. 2b.

The magnetic tape 13 used for a VTR is sometimes operated for reproduction at a speed which is different from the normal feeding speed $V_1$ as operated at the recording operation. For instance, the magnetic tape 13 is operated under various conditions such as "stop", "low", "high speed searching for reproduction" and so on. In this case, the relative track of the magnetic head 5 to the magnetic tape 13 is out of the relative track A in the normal operation as shown in FIG. 2a. For instance, the relative track during the high speed searching for reproduction assumes the relative track B as shown in FIG. 2b. Namely, the magnetic head 5 does not correctly trace the relative track A, (i.e. a track for recording at the normal feeding speed), and becomes out of the relative track A. Therefore, the intensity of signals picked up by the magnetic head 5 becomes low and noises are produced, whereby it is difficult to obtain clear reproduced images.

OBJECTS OF THE INVENTION

It is an object of the present invention to provide a rotating drum device which permits correct tracing of a magnetic head on a track of data which are recorded on the magnetic tape at a normal feeding speed even though the magnetic tape is operated at any feeding speed in reproducing operations.

SUMMARY OF THE INVENTION

The foregoing and other objects of the present invention have been attained by providing a helical-scanning type rotating drum device which comprises a rotating drum around which a magnetic tape is wrapped at a predetermined angle, a magnetic head for reproducing electric signals recorded on the magnetic tape, a supporting member for supporting the magnetic head on the rotating drum so as to be movable along the axis of rotation of the same, a coil mounted on the supporting member, a magnet unit attached to the rotating drum and facing the coil so as to cause displacement of the supporting member depending on the intensity of a control electric current flowing in the coil, and a control means for producing the control electric current in response to a travelling speed of the magnetic tape.

DETAILED DESCRIPTION OF THE PRESENTLY PREFERRED EMBODIMENTS

Preferred embodiments of the rotating drum device of the present invention will be described with reference to the drawings.

The First Embodiment

Figure 1:
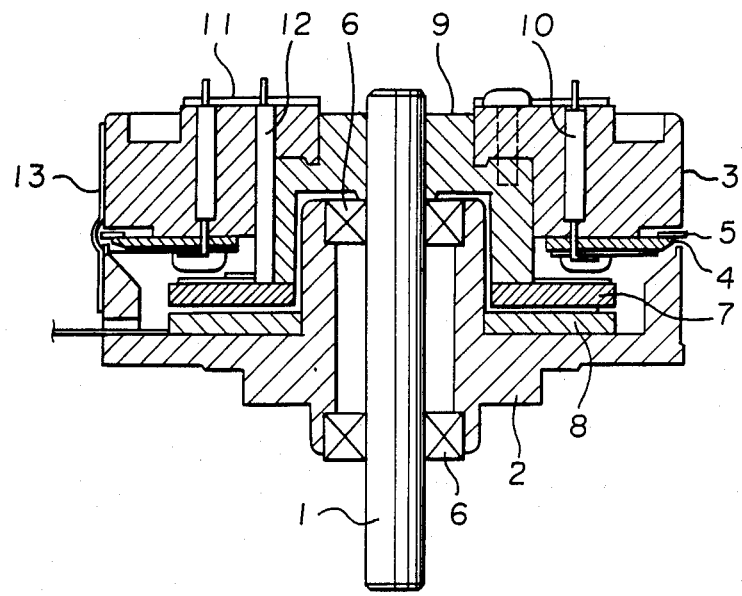
FIG. 1 is a longitudinal cross-sectional view of a conventional rotating drum device.

FIGS. 3 to 6 show a first embodiment of the present invention wherein reference numerals 1 to 3 and 5 to 13 designate the same or corresponding parts as shown in FIG. 1.

In FIGS. 3 to 6, a driving unit 4a is adapted to carry the magnetic head 5 and to cause displacement of the magnetic head vertically along the axis of rotation of the upper drum 3. A plurality of contacts are provided in such a manner as immovable to supply a control electric current to the driving unit 4a. A plurality of electrodes 15 are in slide-contact with a plurality of contacts 14. The contacts 14 are attached to the base block 9, which is rotated together with the rotary shaft 1. A third connecting part 16 is electrically connected to the driving unit 4a through the electrodes 15 and the wiring plate 11. A control means includes the contacts 14, the electrodes 15, and the third connecting part 16.

Figure 5:
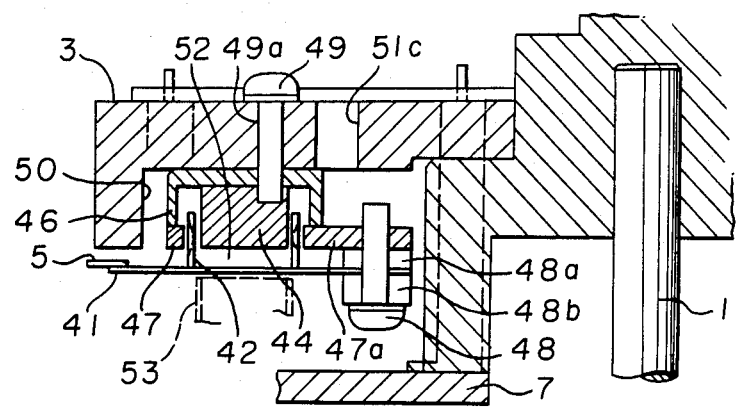
FIG. 5 is an enlarged cross-sectional view showing the important part as in FIG. 3 in more detail.
Figure 6:
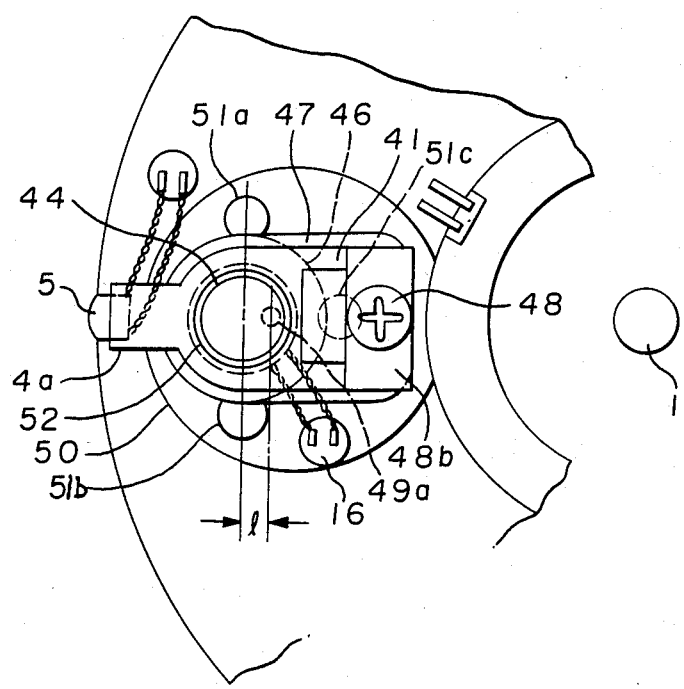
FIG. 6 is an enlarged bottom view of the rotating drum device shown in FIG. 3.
Figure 7:
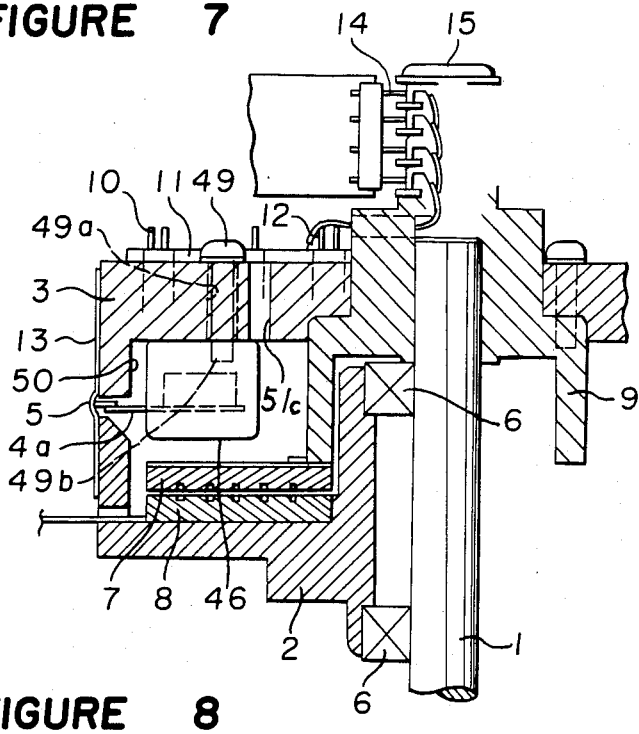
FIG. 7 is a longitudinal cross-sectional view partly omitted of an important part of another embodiment of the rotating drum device according to the present invention.
Figure 8:
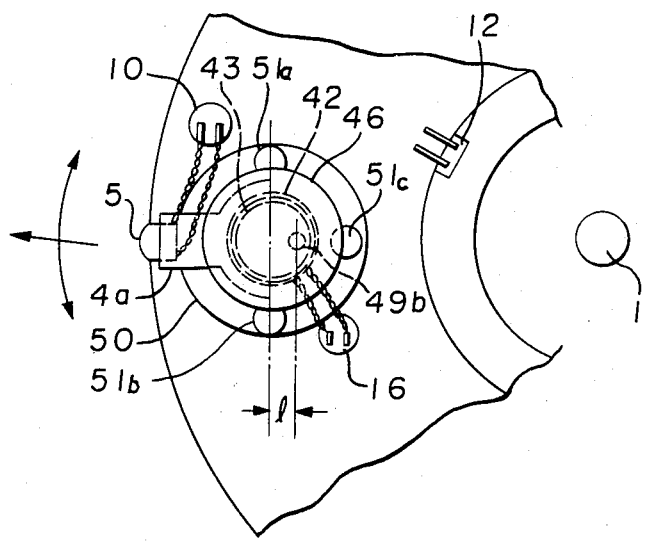
FIG. 8 is a plane view of the rotating drum device shown in FIG. 7.
Figure 9:
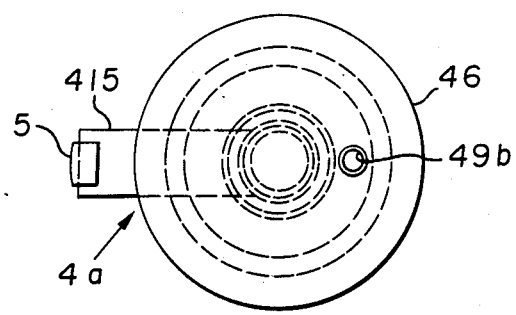
FIG. 9 is a plane view of an important part shown in FIG. 8.

The detail of the first embodiment of the present invention will be described in more detail with reference to FIGS. 5 and 6. A plate spring 41 made of a non-magnetic material has one end supporting the magnetic head 5 and has its other end fixed to the upper drum 3. A cylindrical coil 42 is attached to the plate spring 41. A permanent magnet 44 in a cylindrical pole shape is provided to move the cylindrical coil 42 in the vertical direction by a magnetic action. A yoke 46 made of a ferro-magnetic material is attached to the upper drum 3 and supports the cylindrical permanent magnet 44. A plate 47 made of a ferro-magnetic material is attached to the yoke 46 to form a closed magnetic circuit in association with the yoke 46 and the cylindrical permanent magnet 44. The ferro-magnetic plate 47 and the yoke 46 constitute a magnet mechanism. The ferro-magnetic plate 47 has an extension extending away from the magnetic head 5 to form a fitting part 47a. In FIG. 5 and 6, a reference numeral 48 designates a screw to connect the plate spring 41 to the fitting part 47a, a numeral 48a designates a spacer, a numeral 48b designates a washer, a numeral 49 designates a screw for connecting the yoke 46 to the upper drum 3, and a numeral 50 designates a recess for receiving the driving unit 4a.

The plate spring 41 has a free end freely movable. Accordingly, the cylindrical coil 42 carried by the plate spring 41 is movable in the vertical direction in an annular gap formed between the cylindrical permanent magnetic 44 and the ferro-magnetic plate 47. By supplying a control electric current to the cylindrical coil 42, a magnetic flux is produced in the coil 42 with the result that the coil 42 is moved in the vertical direction by the interaction between the permanent magnet 44 and the coil 42. The displacement of the coil 42 causes the displacement of the plate spring 41; thus, the magnetic head 5 is moved in the vertical direction along the axis of rotation of the rotating drum.

A circular opening 52 is formed around the center of the plate spring 41. A jig 53 in a generally cylindrical form is inserted in the circular opening 52 so as to be in alignment with the cylindrical permanent magnet 44. Then, an annular gap is formed between the cylindrical permanent magnet 44 and the ferro-magnetic plate 47, and the position of the cylindrical coil 42 is correctly determined. In this positional relationship, the screw 48 is fastened to complete an assembling unit of the driving unit 4a.

The assembled driving unit 4a is positioned in the recess 50 of the upper drum 3 by means of the screw 49. In this case, the quantity of projection of the magnetic head from the outer peripheral surface of the upper drum 3 and the posture of the magnetic head 5 should be correctly adjusted. For this purpose, three head position adjusting holes 51a, 51b, 51c are formed in the upper drum 3. The three holes 51a, 51b, 51c and the magnetic head 5 constitute a correct cross-shaped arrangement. A driving unit fitting hole 49a is formed in the upper drum 3 at a positoin deviated by a distance 1 from the crossing point in the radially inward direction. The yoke 46 is temporarily attached to the upper drum 3 by inserting the screw 49 into the hole 49a. Then, a wedge for position-adjusting is inserted in each of the head position-adjusting holes 51a, 51b, and a rotating force is given to the upper drum 3 to adjust the posture of the magnetic head 5 while the quantity of projection of the magnetic head is adjusted by the hole 51c. Thus, the position of the driving unit 4a is correctly adjusted with respect to the upper drum 3. If necessary, the screw 49 is further tightened.

When a control electric current is supplied from the control section to the cylindrical coil 42 positioned in the annular gap formed between the permanent magnet 44 and the ferro-magnetic plate 47, a closed magnetic circuit having a high magnetic flux is formed in the permanent magnet 44, the yoke 46 and the ferro-magnetic plate 47, and a magnetic force is generated to act on the coil 42 to thereby cause displacement of the plate spring 41. In this case, the fitting part 47a as an extension of the ferro-magnetic plate 47 is provided away from the magnetic head 5 to avoid leaking of magnetic flux to the magnetic head 5.

Figure 2:
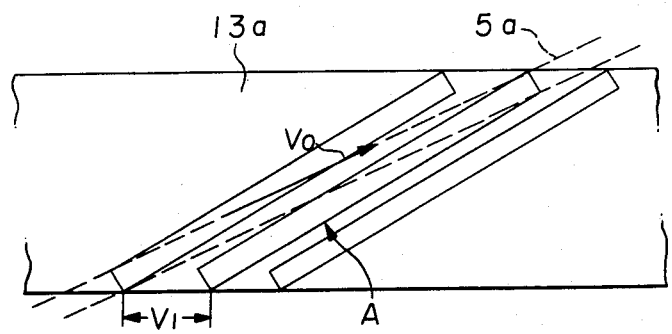
FIG. 2a to 2c are respectively schematic views showing tracks of a magnetic head on a magnetic tape used for a VTR.
Figure 2:
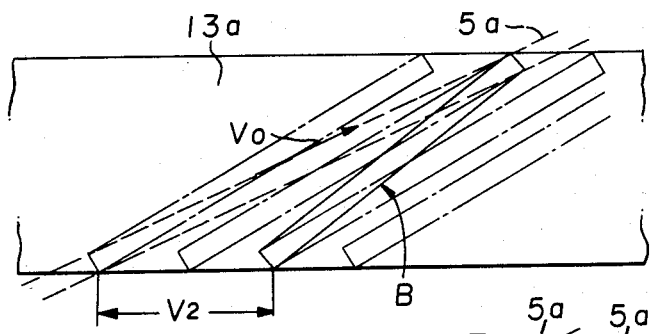
Figure 2:
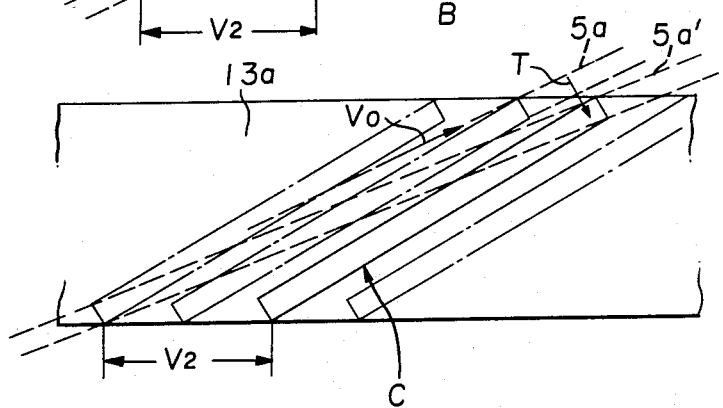
Figure 3:
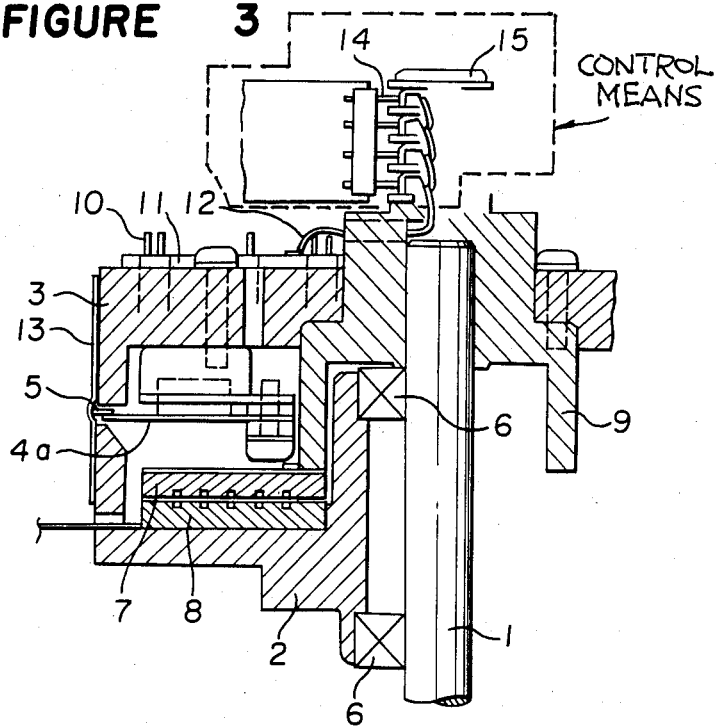
FIG. 3 is a longitudinal cross-sectional view partly omitted of an important part of an embodiment of the rotating drum device according to the present invention.
Figure 4:
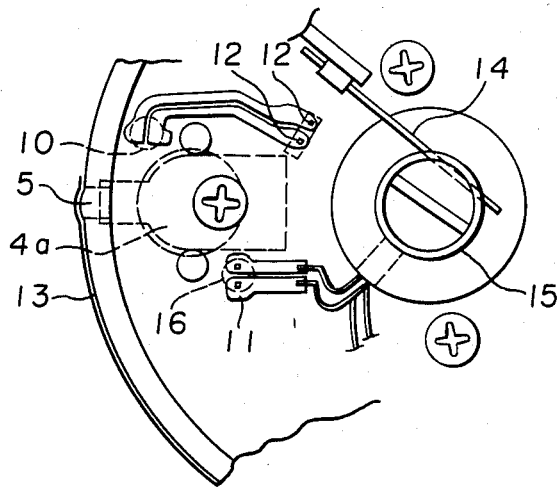
FIG. 4 is a plane view partly omitted of the rotating drum device shown in FIG. 3.

In FIG. 2c, when the magnetic tape feeding speed $V_2$ is higher than the normal reproducing speed $V_1$, the problem of deviation of the magnetic head 5 from the track of the magnetic tape may result as discussed in the foregoing. In the embodiment of the present invention, the relative track of the magnetic head 5 to the magnetic tape 13 can be adjusted to be a track as shown by the character C by changing the track of the magnetic head 5 from the position 5a to the position 5a'. This is done by moving the magnetic head 5 from the fixed position in the direction indicated by an arrow mark T, namely, the vertical direction of the rotating upper drum 3 along its axis of rotation. Thus, the relative track C is in agreement with the relative track A. Thus, by moving the magnetic head 5 even at any magnetic tape feeding speed, the relative track C can be in agreement with the relative track A.

In the above-mentioned embodiment, the fitting part 47a is provided by elongating of the ferro-magnetic plate 47. However, a piece made of a non-magnetic material may be connected to the ferro-magnetic plate 47 to form the fitting part 47a. Alternatively, the piece may be connected to the yoke 46.

The Second Embodiment

FIGS. 7 to 14 show a second embodiment of the present invention. In FIG. 7 to 14, the same reference numerals designate the same or corresponding parts as in the conventional device.

A reference numeral 41a designates a first plate spring made of a non-magnetic material having an end supporting the magnetic head 5, a numeral 43 designates a coil bobbin attached to the plate spring 41a, a numeral 42 designates a cylindrical coil wound around the first coil bobbin 43, a numeral 41b designates a second plate spring for supporting the coil bobbin 43, the second plate spring 41b being deformable together with the first plate spring 41a so that the coil bobbin 43 can be moved linearly, a numeral 44a designates a first permanent magnet in a cylindrical pole shape, a numeral 44b designates a second permanent magnet in a cylindrical pole shape which faces the first permanent magnet 44a with the same magnetic polarity, a numeral 45 designates a center pole made of a ferro-magnetic material which is provided between the first and second permanent magnets 44a, 44b and a numeral 46 designates a yoke.

The yoke 46 includes the first and second plate springs 41a, 41b, the cylindrical coil 42, the coil bobbin 43, the first and second permanent magnets 44a, 44b, and the center pole 45. The yoke 46 is constituted by three splittable portions, i.e., a first portion 46a, a second portion 46b and a third portion 46c so as to facilitate assembling work. A threaded hole 49b is formed in the yoke 46, which is used for fixing it to the upper drum 3. A window 49' is formed in the yoke 46 so that the magnetic head 5 is extended through the window 49' and comes in slide-contact with the magnetic tape 13. The cylindrical coil 42 and the coil bobbin 43 are placed in the annular gap formed by the first and second permanent magnets 44a, 44b and the center pole 45 so as to be movable in the vertical direction. The first plate spring 41a is clamped between the first and second portions 46a, 46b of the yoke 46, and the second plate spring 41b is clamped between the second and third portions 46b, 46c.

Figure 12:
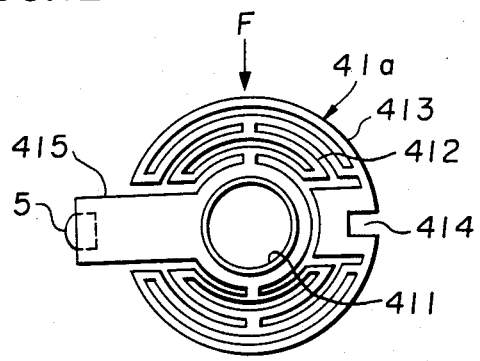
FIG. 12 is a plane view of a first plate spring used for the rotating drum device according to the present invention.
Figure 13:
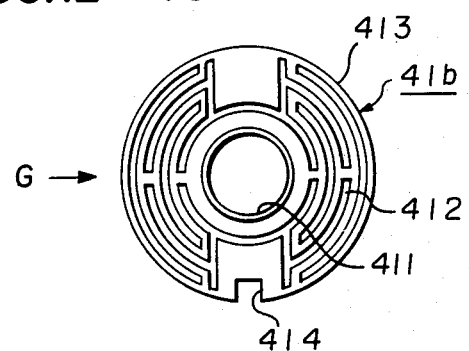
FIG. 13 is a plane view of a second plate spring.

FIGS. 12, 13 respectively show the first and second plate spring 41a, 41b. The first plate spring 41a comprises a coil bobbin fitting part 411, an arcuate intermediate portion 412, and a circular outer circumferential portion 413 which is clamped by the first and second portions 46a, 46b of the yoke 46. A head fitting part 415 extends from the coil bobbin fitting part 411. A plurality of arcuate slots are formed in the arcuate intermediate portion 412, and the intermediate portion 412 is provided with a plurality of joint portions in the radial direction F. The arcuate intermediate portion 412 consists of a pair of subsections which are symmetric with respect to the center and which are surrounded by the coil bobbin fitting part 411 and the circular outer circumferential portion 413. The joint portions connect the coil bobbin fitting part 411 to the circular outer circumferential portion 413. The outer circumferential portion 413 is provided with a recess 414 at a part of the outer periphery to determine a position for the rotating direction. When the first plate spring 41a is mounted on the yoke 46, the recess 414 is fitted to a projection (not shown) formed in the inner wall of the yoke 46 so that the magnetic head 5 is correctly projected from the window 49'.

The construction of the second plate spring 41b is substantially the same as that of the first plate spring 41a (i.e., it has a coil bobbin fitting part 411, a arcuate intermediate portion 412, a circular outer circumferential portion 413, and a recess 414) except that the second plate spring 41b is not provided with a head fitting part 415 and that the position of a plurality of joint portions is 90° shifted from the radial direction F to the radial direction G. With the construction of the first and second plate springs 41a, 41b the coil bobbin 43 is supported to be movable in only the vertical direction, and the magnetic head 5 is prevented from rotation in the direction H and is movable linearly in the vertical direction.

A closed magnetic circuit is formed by the first and second portions 46a, 46b of the yoke 46 and the first permanent magnet 44a, whereby a magnetic force D is generated radially from the center pole 45 to the yoke 46. Similarly, a closed magnetic circuit is formed in the second permanent magnet 44b and the second and third parts 46b, 46c of the yoke 46. The direction of the closed magnetic circuit is opposite to that formed in the first permanent magnet 44a and first and second parts 46a, 46b. The second closed magnetic circuit produces a magnetic flux E. Each of the magnetic fluxes D and E traverses the annular gap in the same direction. Thus, a magnetic flux in the sum of the two magnetic fluxes D, E traverses through the cylindrical coil 42. In this case, when a control electric current is supplied to the coil 42 from the contacts 14 through the electrodes 15 and the first and second connecting parts 10, 12, the coil 42 is moved linearly in the vertical direction in parallel to the axis of rotation of the rotating drum device.

Since the first and second permanent magnets 44a, 44b are completely surrounded by the first, second, and third portions 46a, 46b, 46c of the yoke 46, a leaking magnetic flux in the magnetic head 5, the upper transmitter 7, or the other can be kept small by using a material having a high magnetic transmittance for the yoke 46 or by making the dimension of the window 49' small; thus, a large magnetic field for the coil can be obtained.

In the second embodiment, a correct parallel movement of the magnetic head can be obtained since the first and second plate springs 41a, 41b are arranged at both sides of the center pole 45. Further, in the second embodiment, a part of the yoke 46 and the ferro-magnetic plate 47 are projected toward the coil 42. Therefore, a uniform magnetic field can be formed around the coil 42, so that displacement of the magnetic head 5 can be correctly controlled.

Figure 14:
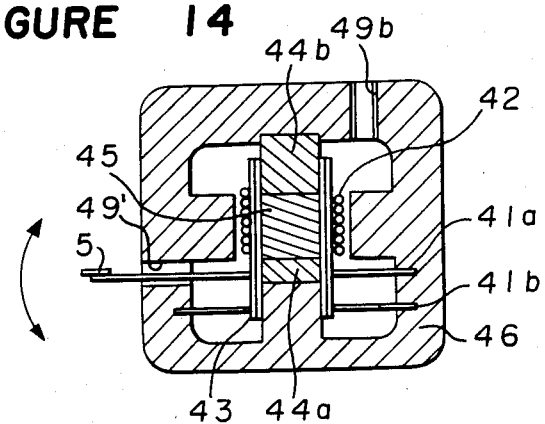
FIG. 14 is a cross-sectional view of another embodiment of the driving unit used for the rotating drum device of the present invention.

Instead of the arrangement of the plate springs 41a, 41b at the both sides of the center pole 45, they may be arranged at a side of the yoke 46 as shown in FIG. 14.

In the above-mentioned embodiments, the permanent magnets 44a, 44b are placed in a symmetric manner. However, it is feasible that the magnet 44b is made large to be used as the primary magnet and that the magnet 44a is made small to be used for an auxiliary magnet to thereby prevent a leaking magnetic flux and to adjust a magnetic flux density traversing the annular gap.

Figure 10:
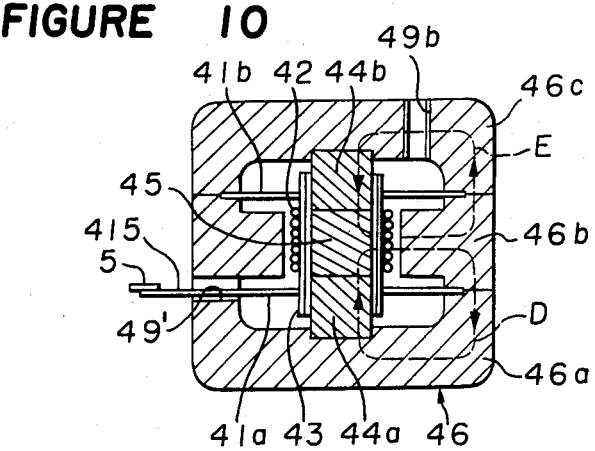
FIG. 10 is a cross-sectional view showing the inner construction of the part as shown in FIG. 9.
Figure 11:
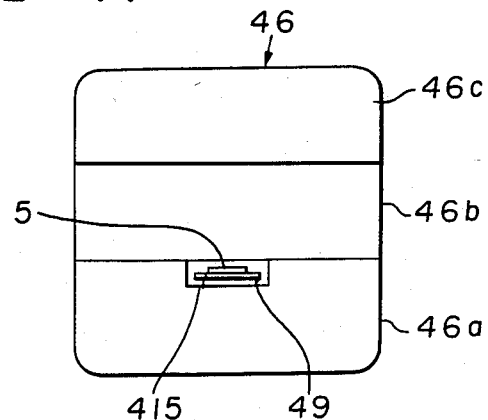
FIG. 11 is a front view of the part shown in FIG. 9.

The yoke 46 may be divided into two or more than four parts. Further, the yoke 46 is splittable in a way other than the way as shown in FIGS. 10 and 11 as long as the yoke 46 entirely surrounds the coil 42, the coil bobbin 43, and permanent magnets 44, 44a, 44b. In the above-mentioned embodiments, the plate springs 41, 41a, 41b are used as a supporting member. However, torsion springs or parallel springs may be used as the supporting member. The shape of the plate springs 41, 41a, the coil 42, the permanent magnets 44, 44a, 44b, the center pole 45, and so on may be rectangular or other shapes other than the circular shape shown in the figures.

In the embodiment shown in FIG. 6, the head position adjusting holes 51a, 51b, 51c and the magnetic head 5 are arranged in a cross-shaped. However, another arrangement may be utilized. Further, the position of the screw 49 may be determined near the magnetic head 5 other than the position near the rotating shaft 1.

In the above-mentioned embodiments, a single magnetic head 5 is provided in the upper drum 3. However, an additional magnetic head may be provided at the 180° opposing position so that each two pairs among the four contacts are used to supply the control electric current to the cylindrical coil 42 as a driving unit of the magnetic head device.

As described above, in accordance with the present invention, the magnetic head 5 is adapted to move in the vertical direction along the axis of rotation of the rotating drum depending on the traveling speed of the magnetic head 13. Accordingly, the position for scanning of the magnetic head 5 during the reproducing operation always meets the track of the magnetic tape 13 even when the magnetic tape 13 moves at any operating speed. In a VHS type VTR, a pair of the magnetic heads 5 are inclined in the opposite direction to conduct recording. In this case, there may be difficulty in reduction of the signal level for each recording track because the recording track recorded by one of the magnetic head 5 is traced by the other magnetic head 5 for reproducing. However, in accordance with the present invention, such disadvantage can be overcome by moving the magnetic head 5 vertically along the axis of rotation of the rotating drum.

We claim:

1. A helical-scanning type rotating drum device which comprises:
    (a) a rotating drum around which a magnetic tape is wrapped at a predetermined angle, said magnetic tape having a traveling speed during use of said rotating drum device;
    (b) a magnetic head for reproducing electric signals recorded on said magnetic tape;
    (c) a supporting member for supporting said magnetic head on said rotating drum so as to be movable along the axis of rotation of the same;
    (d) a coil mounted on said supporting member, said coil having a control electric current flowing therein during use of said rotating drum device, said control electric current having a controllable intensity;
    (e) a magnetic unit attached to said rotating drum and facing said coil so as to cause displacement of said supporting member depending on the intensity of said control electric current flowing in said coil; and
    (f) a control means for producing said control electric current in response to the traveling speed of said magnetic tape,
wherein:
    (g) said supporting member comprises a vertically arranged pair of plate springs between which said coil is placed;
    (h) a tongue portion is formed in one of said plate springs to support said magnetic head;
    (i) arcuate slots are formed in each of said plate springs; and
    (j) the position of the arcuate slots in one of said plate springs is shifted from that of the other by at least approximately 90°.

2. The rotating drum device according to claim 1, wherein said supporting member is made of a non-magnetic material.

3. The rotating drum device according to claim 1, wherein said magnetic unit comprises a rod magnet which is inserted in said coil mounted on said supporting member.

4. The rotating drum device according to claim 3, wherein said magnetic unit further comprises a yoke.

5. The rotating drum device according to claim 1, wherein said control means produces a control electric current depending on the difference between a reference speed and a reproduction speed of said magnetic tape.

6. The rotating drum device according to claim 5, wherein said reference speed is a speed obtained when said magnetic tape normally runs for reproducing operation.

7. The rotating drum device according to claim 5, wherein:
    (a) said control means is adapted to produce the control electric current for causing displacement of said magnetic head downwardly along the axis of rotation from a first position of said magnetic head during operation at the reference speed when the speed for reproduction is higher than the reference speed and
    (b) said control means is adapted to produce the control electric current for causing displacement of said magnetic head upwardly along the axis of rotation from a second position of said magnetic head during operation at the reference speed when the speed for reproduction is lower than the reference speed.

8. A helical-scanning type rotating drum device which comprises:
    (a) a rotating drum around which a magnetic tape is wrapped at a predetermined angle, said magnetic tape having a traveling speed during use of said rotating drum device;
    (b) a magnetic head for reproducing electric signals recorded on said magnetic tape;
    (c) a supporting member for supporting said magnetic head on said rotating drum so as to be movable along the axis of rotation of the same;
    (d) a coil mounted on said supporting member, said coil having a control electric current flowing therein during use of said rotating drum device, said control electric current having a controllable intensity;
    (e) a magnetic unit attached to said rotating drum and facing said coil so as to cause displacement of said supporting member depending on the intensity of said control electric current flowing in said coil; and (f) a control means for producing said control electric current in response to the traveling speed of said magnetic tape, wherein:

(g) said magnetic unit comprises a rod magnet which is inserted in said coil mounted on said supporting member;

(h) said rod magnet comprises a pair of magnetic pieces between which a ferro-magnetic substance is interposed; and (i) the opposing parts of said magnetic pieces have the same polarity.

9. The rotating drum device according to claim 8, wherein said supporting member is a plate spring having:

(a) a first side fixed to said rotating drum;
(b) a second side supporting said magnetic head; and
(c) an intermediate portion supporting said coil.

10. The rotating drum device according to claim 9, wherein:

(a) said plate spring is substantially circular;
(b) a plurality of arcuate slots are formed in said plate spring; and
(c) at least part of the outer circumference of said plate spring is fixed to said rotating drum.

11. The rotating drum device according to claim 8, wherein:

(a) said supporting member comprises a vertically arranged pair of plate springs between which said coil is placed and
(b) a tongue portion is formed in one of said plate springs to support said magnetic head.

12. The rotating drum device according to claim 8, wherein said supporting member is made of a non-magnetic material.

13. The rotating drum device according to claim 8, wherein said magnetic unit further comprises a yoke.

14. The rotating drum device according to claim 13, wherein:

(a) said yoke has a cylindrical shape so as to surround said supporting member and
(b) said yoke is provided with a window through which a magnetic head fitting part of said supporting member is extended.

15. The rotating drum device according to claim 14, wherein said yoke is provided with an annular projection inwardly extending toward said coil.

16. The rotating drum device according to claim 8, wherein said control means produces a control electric current depending on the difference between a reference speed and a reproduction speed of said magnetic tape.

17. The rotating drum device according to claim 16, wherein said reference speed is the speed obtained when said magnetic tape normally runs for reproducing operation.

18. The rotating drum device according to claim 16, wherein:

(a) said control means is adapted to produce the control electric current for causing displacement of said magnetic head downwardly along the axis of rotation from a first position of the magnetic head during operation at the reference speed when the speed for reproduction is higher than the reference speed and (b) said control means is adapted to produce the control electric current for causing displacement of said magnetic head upwardly along the axis of rotation from a second position of the magnetic head during operation at the reference speed when the speed for reproduction is lower than the reference speed.

19. A helical-scanning type rotating drum device which comprises:

(a) a rotating drum around which a magnetic tape is wrapped at a predetermined angle, said magnetic tape having a traveling speed during use of said rotating drum device;
(b) a magnetic head for reproducing electric signals recorded on said magnetic tape;
(c) a supporting member for supporting said magnetic head on said rotating drum so as to be movable along the axis of rotation of the same;
(d) a coil mounted on said supporting member, said coil having a control electric current flowing therein during use of said rotating drum device, said control electric current having a controllable intensity;
(e) a magnetic unit attached to said rotating drum and facing said coil so as to cause displacement of said supporting member depending on the intensity of said control electric current flowing in said coil; and
(f) a control means for producing said control electric current in response to the traveling speed of said magnetic tape, wherein:

(g) said magnetic unit comprises a rod magnet which is inserted in said coil mounted on said supporting member;
(h) said magnetic unit further comprises a yoke;
(i) said yoke has a cylindrical shape so as to surround said supporting member; and
(j) said yoke is provided with a window through which a magnetic head fitting part of said supporting member is extended.

20. The rotating drum device according to claim 19, wherein said yoke is provided with an annular projection inwardly extended toward said coil.

21. The rotating drum device according to claim 19, wherein said supporting member is a plate spring having:

(a) a first side fixed to said rotating drum;
(b) a second side supporting said magnetic head; and
(c) an intermediate portion supporting said coil.

22. The rotating drum device according to claim 21, wherein:

(a) said plate spring is substantially circular;
(b) a plurality of arcuate slots are formed in said plate spring; and
(c) at least part of the outer circumference of said plate spring is fixed to said rotating drum.

23. The rotating drum device according to claim 19, wherein:

(a) said supporting member comprises a vertically arranged pair of plate springs between which said coil is placed and
(b) a tongue portion is formed in one of said plate springs to support said magnetic head.

24. The rotating drum device according to claim 23, wherein:

(a) arcuate slots are formed in each one of said plate springs and (b) the position of the arcuate slots in one of said plate springs is shifted from that of the other by at least approximately 90°.

25. The rotating drum device according to claim 19, wherein said supporting member is made of a non-magnetic material.

26. The rotating drum device according to claim 19, wherein:
said magnetic rod comprises a pair of magnetic pieces between which a ferro-magnetic substance is interposed.

27. The rotating drum device according to claim 19, wherein said cylindrical yoke is provided with an annular projection inwardly extended through said coil.

28. The rotating drum device according to claim 19, wherein said control means produces a control electric current depending on the difference between a reference speed and a reproduction speed of said magnetic tape.

29. The rotating drum device according to claim 28, wherein said reference speed is a speed obtained when said magnetic tape normally runs for reproducing operation.

30. The rotating drum device according to claim 28, wherein:
(a) said control means is adapted to produce the control electric current for causing displacement of said magnetic head downwardly along the axis of rotation from a first position of said magnetic head during operation at the reference speed when the speed for reproduction is higher than the reference speed and
(b) said control means is adapted to produce the control electric current for causing displacement of said magnetic head upwardly along the axis of rotation from a second position of said magnetic head during operation at the reference speed when the speed for reproduction is lower than the reference speed.

* * * * *